United States Patent [19]

Killer et al.

[11] Patent Number: 5,353,912
[45] Date of Patent: Oct. 11, 1994

[54] ARRANGEMENT FOR THE SORTING OF PIECE GOODS

[75] Inventors: Viktor Killer, Riedikon; Willy Maier, Kloten, both of Switzerland

[73] Assignee: Grapha-Holding AG, Hergiswil, Switzerland

[21] Appl. No.: 10,633

[22] Filed: Jan. 28, 1993

[30] Foreign Application Priority Data

Feb. 10, 1992 [DE] Fed. Rep. of Germany ....... 4203799

[51] Int. Cl.[5] .................................................. B65G 47/10
[52] U.S. Cl. ........................................ 198/365; 198/802
[58] Field of Search ............... 198/365, 802, 476.1, 198/477.1

[56] References Cited

U.S. PATENT DOCUMENTS

| | | | |
|---|---|---|---|
| 3,231,066 | 1/1966 | Harrison et al. | 198/802 X |
| 3,327,836 | 6/1967 | Burt | 198/802 X |
| 3,662,874 | 5/1972 | Muller | 198/802 X |
| 3,669,245 | 6/1972 | Wooten et al. | 198/802 X |
| 3,913,725 | 10/1975 | Harrison . | |
| 4,031,998 | 6/1977 | Suzuki et al. | 198/802 X |
| 4,089,404 | 5/1978 | Venzke | 198/365 |
| 4,413,721 | 11/1983 | Bollier | 198/365 |
| 4,726,464 | 2/1988 | Canziani | 198/365 |
| 4,856,642 | 8/1989 | Nicolson et al. | 198/365 |
| 4,938,335 | 7/1990 | Canziani | 198/365 |
| 5,018,928 | 5/1991 | Hartlepp | 198/365 X |
| 5,086,905 | 2/1992 | Pölling | 198/802 X |

FOREIGN PATENT DOCUMENTS 2151439  4/1972  Fed. Rep. of Germany .
3050102  7/1981  Fed. Rep. of Germany .

*Primary Examiner*—Cheryl L. Gastineau
*Attorney, Agent, or Firm*—Roper & Quigg

[57] ABSTRACT

The sorting plant has two loops (2,102) on which endless cart chains (4,104) circulate. The loops (2,102) extend parallel and adjacent to each other at a transfer station (100). The cart chains (4,104) are driven by synchronized drives (6,106) in such a way that two carts (5,105) move exactly adjacent to each other at the transfer station (100). The second loop (2) is extended along a somewhat lower elevation at this location. By tipping the receptacles (113,114) of a cart (105) on the first loop (102), unit load (10) occupying the same is directly transferred onto the cart (5) of the second loop (2) that moves exactly adjacent to it. This arrangement makes it possible to load one gross distribution facility (101) and two fine distribution facilities (1,1a) in a mail distribution center in a reasonable manner and with small spatial requirements.

39 Claims, 10 Drawing Sheets

ARRANGEMENT FOR THE SORTING OF PIECE GOODS

TECHNICAL FIELD

This invention is directed to a sorting plant for piece goods wherein the sorting plant has two loops on which endless cart chains circulate.

BACKGROUND ART

German Patent 30 50 102 describes a sorting plant: an endless cart chain circulates on a closed rail that forms a loop. Each cart of this chain has a receptacle that can be tilted about a slanted axis from its horizontal starting position into two tilting positions. Several loading stations at which the unit load is loaded into the receptacles and several target stations are assigned to the cart into which the unit load is loaded at the loading station. Once the cart reaches the target station, a horizontal rail is transversely displaced, so that it presses against the outer periphery of a rotating disk arranged on the cart. This results in the disk turning and thus the tilting of the receptacle into one of its two tilting positions, so that the unit load is unloaded at the target station.

However, if many target stations have to be serviced, this type of sorting plant is not reasonably utilized because a larger number of unoccupied carts must travel over extensive distances.

DISCLOSURE OF INVENTION

The present invention is based on the objective to further develop a sorting plant of the above-mentioned type in such a way that it provides the possibility of reasonable utilization in large distribution centers. This objective is attained by the combination of characteristics outlined in, for example, claim 1.

If the sorting plant is separated into a first loop on which the carts are loaded with the unit load and at least one second loop on which the target stations are arranged, the second loop can pass twice through a transfer station arranged on the first loop. This means that the second loops can be divided into two half loops each, so that the transport distance between the loading and target stations and hence also the return distance of the empty carts is substantially shortened. The cart chains can be utilized more reasonably, and the space requirement is substantially reduced, which in turn reduces the costs for the plant as well as the maintenance. One example of the invention is described in detail with the aid of the figures.

MODES FOR CARRYING OUT THE INVENTION

Figure 1:
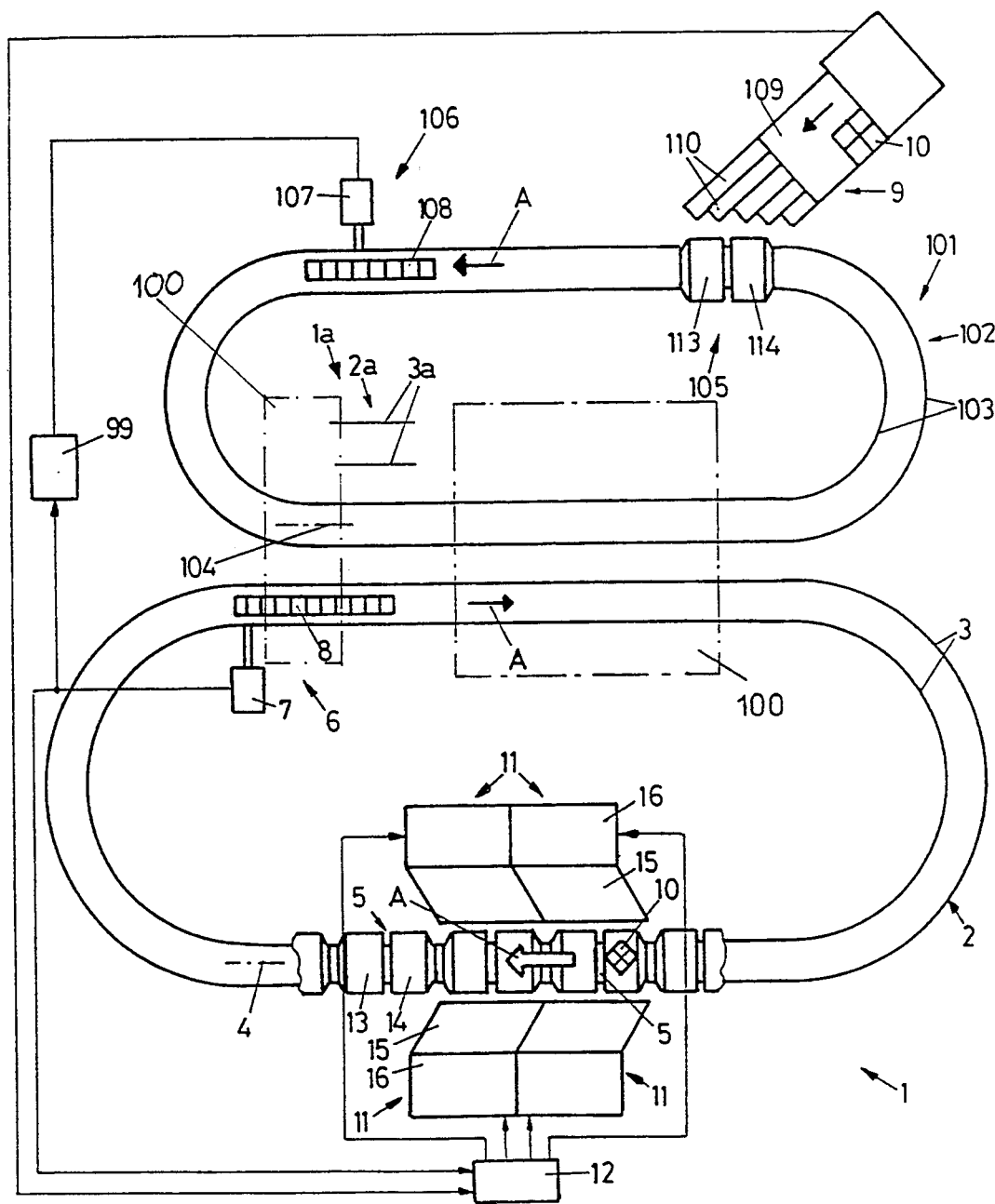
FIG. 1 is a simplified horizontal plan of the plant.
Figure 2:
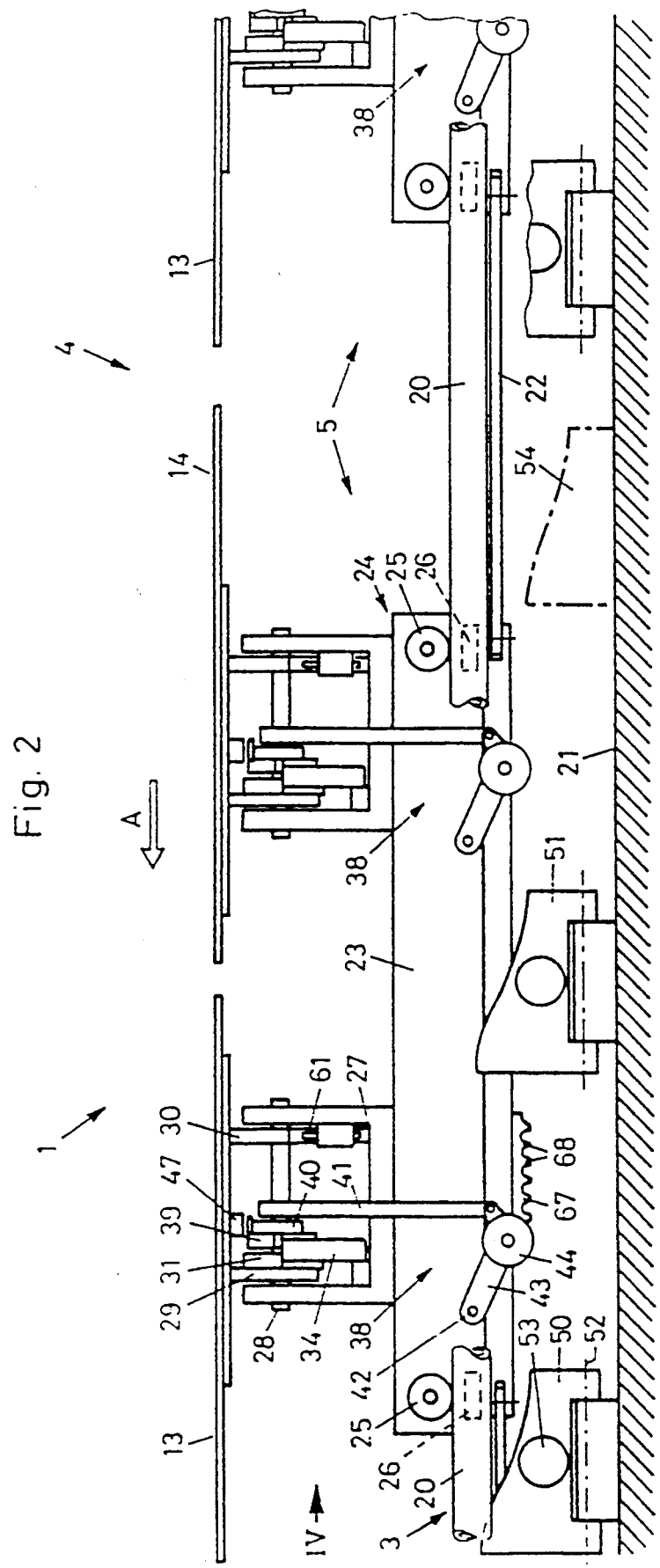
FIG. 2 is a side view of a portion of the plant.
Figure 3:
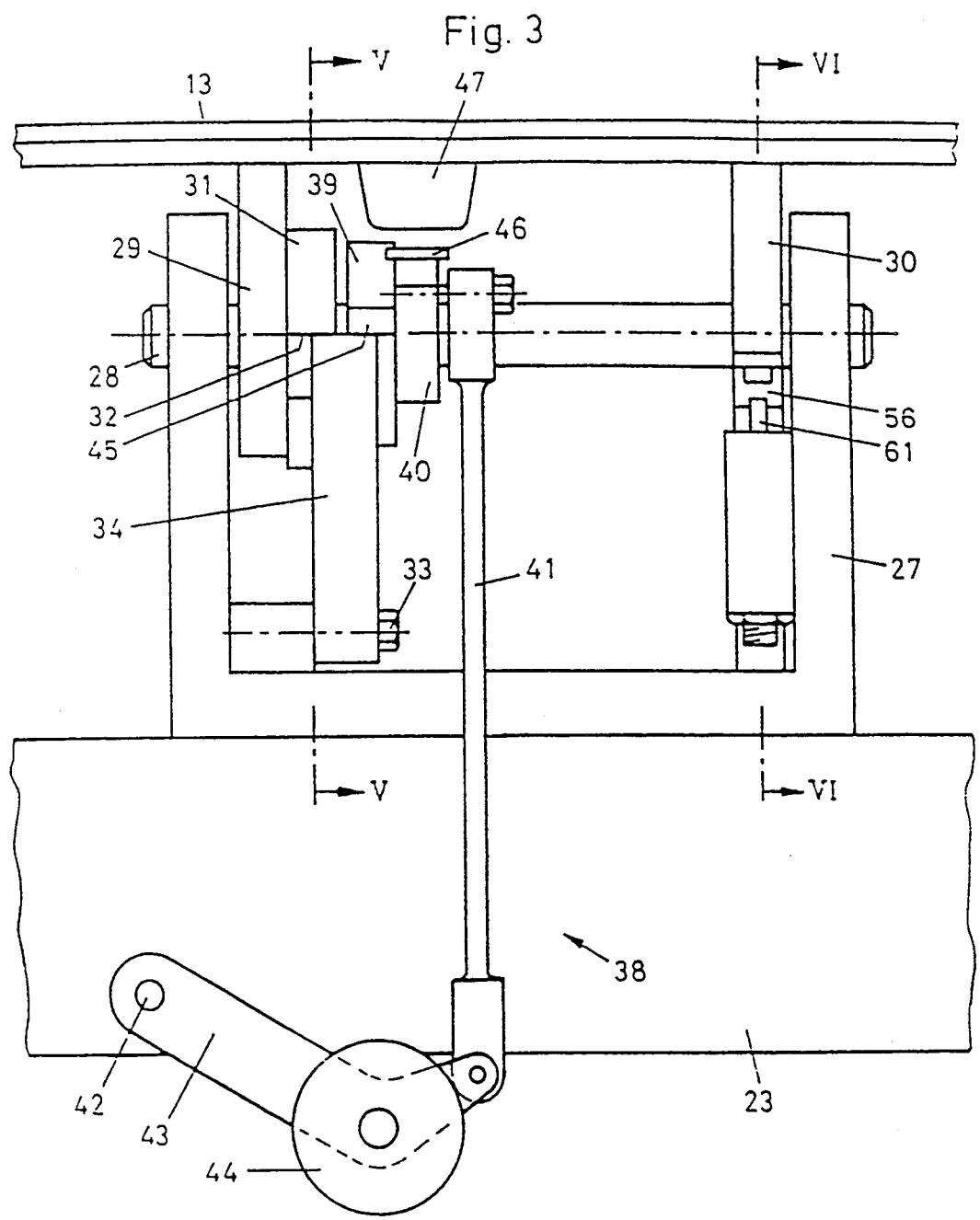
FIG. 3 is an enlarged detail of the view shown in FIG. 2.

The plant which is schematically illustrated in FIG. 1 can be utilized for the sorting of mail in mail distribution centers. It comprises a gross distribution facility (101) and several fine distribution facilities (1,1a). The facilities (1,1a and 101) have the same essential construction. The reference numerals of the facility (101) that were increased by 100 as compared to the other facility refer to the same structural elements of the facility (101) as were designated by the respective one or two digit reference numerals of the example of the facility (1). Differences between the facilities (1 and 101) will be discussed later in the text. Each plant (1,1a,101) comprises a closed rail (3,3a,103) that forms a loop (2,2a,102), as well as an endless cart chain (4,104) that consists of carts (5,105) that are coupled and circulate on the given rail (3,3a,103).

The loops (2,102) are illustrated in a very simplified manner in order to provide an improved overview; they are parallel and adjacent to each other at a single transfer station (100) for the same reason. In practical applications at least one of the loops (2,102) is constructed three-dimensionally, preferably the gross distribution loop (102), because this loop is substantially shorter and utilizes correspondingly fewer carts (105) than the fine distribution loop (2,2a). This makes it possible to guide each fine distribution loop (102) at two transfer locations 100 along the gross distribution loop 102 and hence to divide the fine distribution loops (2,2a) into two approximately equal halves.

Drives (6,106) each consisting of a drive motor (7,107) and a drive chain (8,108), move the carts (4,104) in the direction (A). If the loop (2) is a long loop, it is practical to distribute several drives (6) along the loop (2). If the loop (2) has a length of 1 km, five drives (6) can be provided which must be synchronized with each other with regard to angular velocity and tilt angle. The drive (6) closest to the transfer station (100) is additionally synchronized with the drive (106) with regard to speed and tilt angle via a synchronizing device (99) in such a way that a cart (5) passes the transfer station (100) exactly adjacent to a cart (105), in such a way that it can be possibly offset backwards in moving direction (A) by a small predetermined distance. The simplest solution for the synchronizing device (99) consists of a mechanical coupling, for example via a Cardan shaft, so that the motor (107) can be omitted.

Several loading stations (9) at which packages (10) are loaded onto the cart chains (104) are arranged along the loop (102), and one of several target stations (11) is assigned to each loaded cart (105) at this location. A bar code indicating the destination is attached to the packages (10) at the loading stations (9), of which only one is illustrated in the figure in order to provide an improved overview. The packages are subsequently transported from a first conveyor belt (109) onto a stationary, segmented second conveyor belt (110) where a reading device reads and stores the bar code. As soon as a free cart (105) passes, the package (10) is loaded onto this cart (105) by means of the conveyor belt (110), and a signal is simultaneously transmitted to a central control device (12) which stores the destination of the package and the number of the cart. Depending on the destination on loop (2) or loop (2a), the package (10) is transferred onto the cart (5) that moves exactly adjacent to the first cart at the transfer station (100) in a manner described later in the text, if this cart is unoccupied. If the cart is occupied, the package circulates once around the loop (102).

At the assigned target station (11) the control device (12) tilts one receptacle (13,14) or both receptacles (13,14) of the loaded cart (5) about an axis that extends in the longitudinal direction of the cart. This results in the package (10) sliding out of the receptacle (13,14) onto a slanted chute (15) of the target station (11) from which it slides into a shaft (16) which leads, for example, to a collection container arranged below the shaft. The loading stations (9), as well as the target stations (11), are longer in the direction (A) than the sum of the lengths of both receptacles (13,14) of a cart (5). This means that long packages can be loaded onto both receptacles (13,14) of a cart and unloaded at the given target station (11) by simultaneous tilting of both receptacles (13,14). Shorter packages are only placed onto one individual receptacle (13 or 14), which means that only this receptacle (13 or 14) must be tilted at the target station (11). This also means that the other receptacle (14 or 13) of this cart (5) can simultaneously transport another short package (10) to the same target station (11) or to a different target station. If large packages that occupy both receptacles (13,14) are relatively rare, the sorting capacity of the plant (1) is nearly doubled by the separation of the transport elements into two individual receptacles (13,14) per cart. Since both receptacles (13,14) can collectively serve as a receptacle for a large package and are mounted onto a collective running gear, no relative movements occur between the receptacles on curves or inclines, so that the large package can be safely transported without any displacement.

As an alternative or in addition to the control of the tilting process of the receptacles (13, 14) by the control device (12), a reading device to read the bar code on the package (10) can be arranged before each target station (11) or even only before the first target station (11), whereby the reading device actuates the tilting process after the cart (5) has traversed the correct distance.

FIGS. 2 to 6 show a cart (5) of the plant (1) in detail. The rail (3) consists of two parallel pipes (20) separated by a certain lateral distance that are mounted onto a foundation (21) by means of supports not shown in the figures. The carts (5) of the chain (4) are coupled by toggle links (22) with spherical joints. The carts include a bearer (23) and a running gear (24) consisting of rollers (25) and guide rollers (26) that roll along the pipes (20), whereby the running gear is attached to the bearer. The toggle links (22) are coupled with the support beam (23), adjacent to each other in the plane of the guide rollers (26), so that the tensile forces and the impact forces of the toggle links (22) and the lateral guiding forces only result in minute tilting moments on the cart (5).

Two receptacle carriers (27) are screwed onto the bearer (23). The receptacles (13,14) are supported on these carriers (27) in a swivelling manner by means of bearing boxes (29,30) with needle bearings, so that the receptacles can be tilted about a collective horizontal axis (28) that extends in the longitudinal direction of the cart. A locking disk (31) is screwed on to the bearing box (29). The disk (31) has two radial shoulders (32) on its outer periphery. Two detent pawls (34) that can be swiveled about axes (33) that extend parallel to the axis (28) engage these shoulders in the starting position of the receptacles (13,14) illustrated in FIGS. 2, 3 and 5. The detent pawls (34) are braced against each other by a spring (35).

One activation element (38) is assigned to each receptacle (13,14). This activation element consists of an unlocking disk (39) that is supported in a swiveling manner on the axis (28) by means of further needle bearings, an activation lever (40) that is screwed onto the disk (39), two connecting rods (41), one arm (43) each on the bearer (23) which can be tilted about a transverse axis (42), and one activation roller (44), each of which is supported on the arm (43) in a rotating manner. The disk (39) has two slanted surfaces (45) that extend parallel to the axis (28) and lift one of the two detent pawls (34) from its locking position illustrated in FIG. 5 during the swiveling movement of the disk (39) and hence unlocks the locking disk (31). After a minute unlocking angle is obtained, one of the two disks (46) on the free ends of the levers (40) impacts a rubber buffer (47) attached on the receptacle (13,14) and thus tips this receptacle (13,14).

Figure 4:
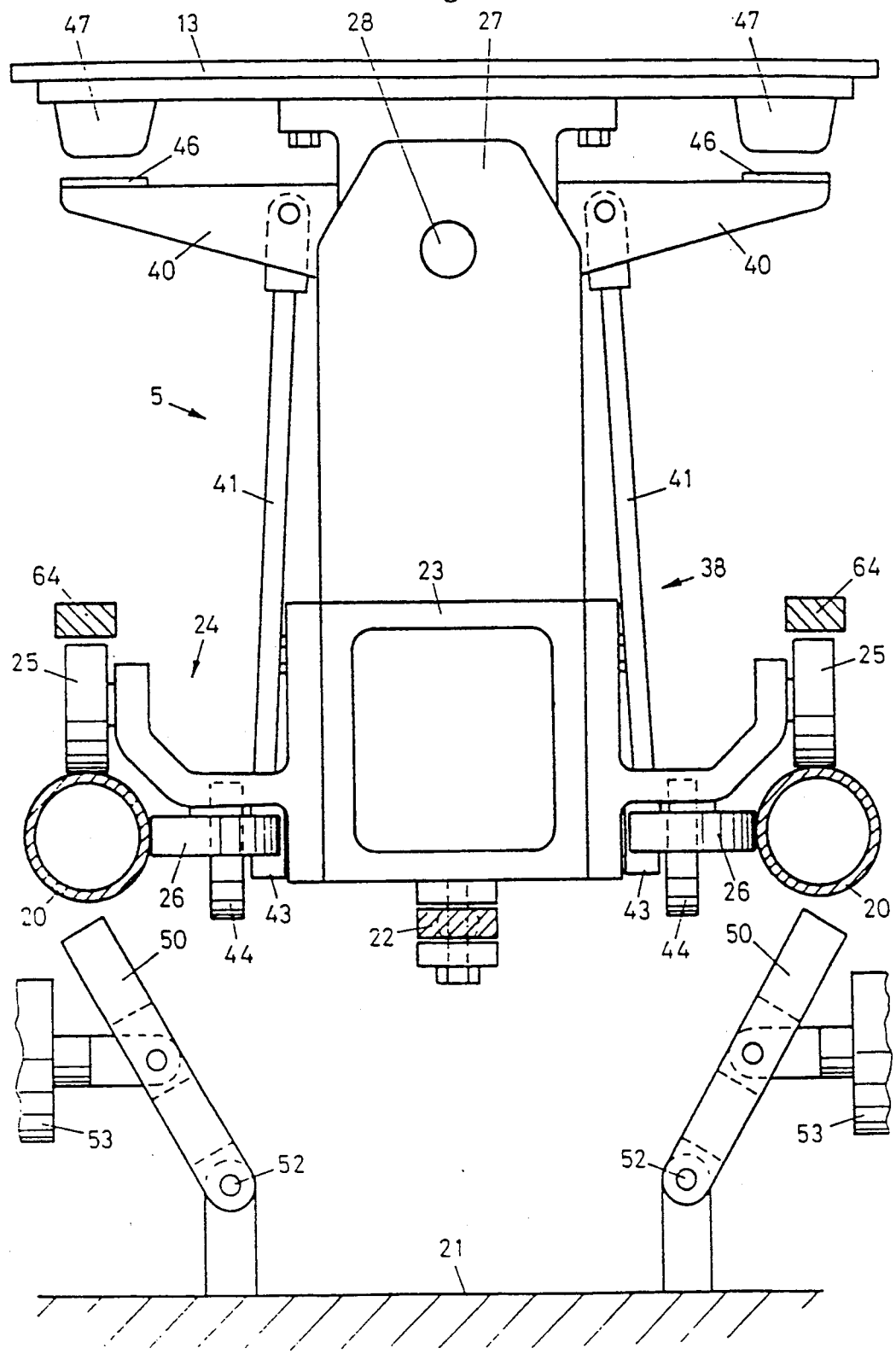
FIG. 4 is a front view of a cart.
Figure 5:
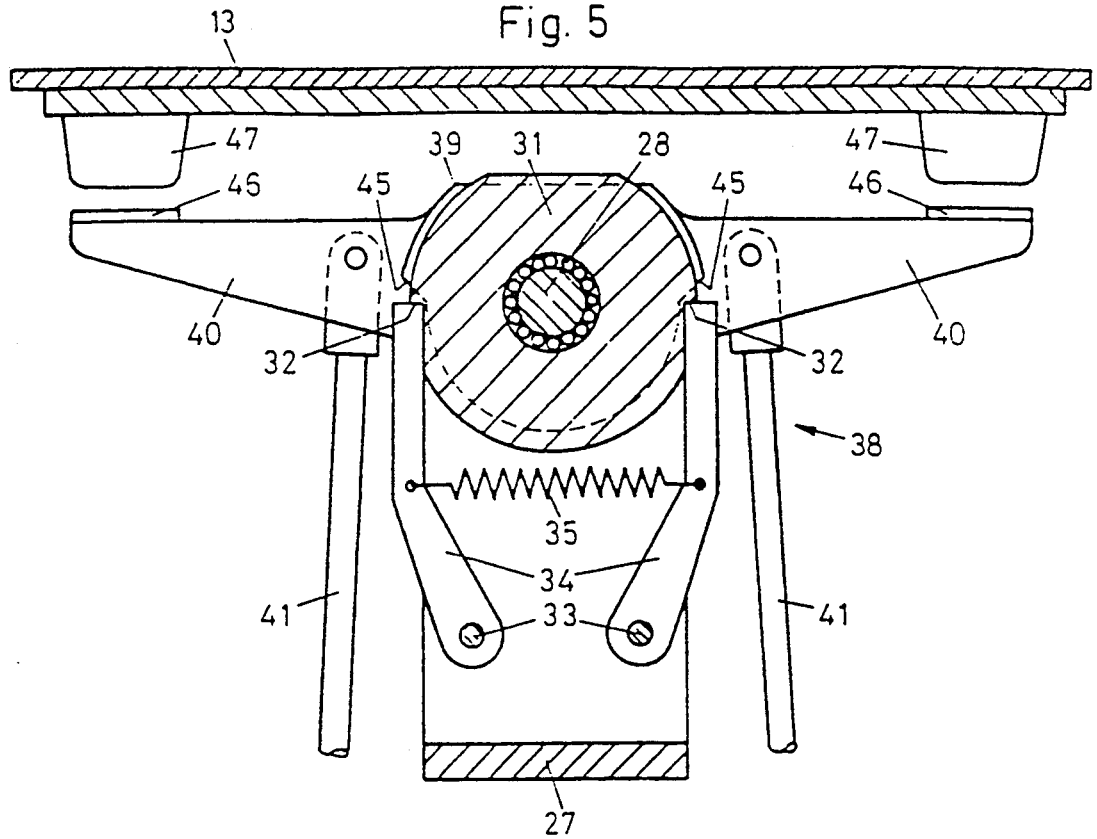
FIGS. 5 and 6 are sections along the lines V—V and VI—VI respectively in FIG. 3.

In order to tip the receptacles (13,14), each target station (11) has two radial cams (50,51) on the side of the rails (3) that opposes the station, hereby the radial cams can be swiveled relative to the foundation (21) from the tilted inactive position illustrated in FIG. 4 into a vertical active position above a horizontal axis (52) by means of one pneumatic cylinder (53) each. The roller (44) under consideration impacts the radial cam (50,51) in the vertical active position, thus displacing the lever (40) with the unlocking disk (39). Both radial cams (50,51) of a target station (11) are at the same distance from each other as the two activation rollers (44) on one side of the cart (5).

Figure 6:
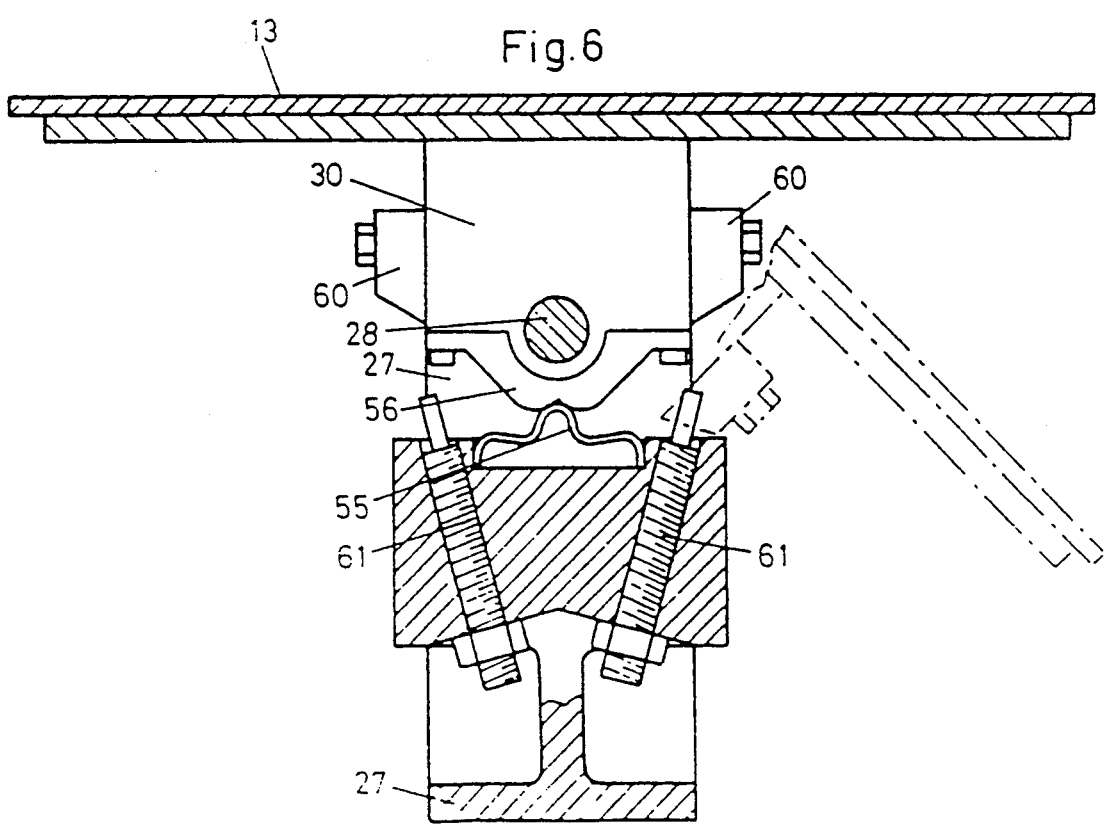

Recovery cams (54) which return each tilted receptacle (13,14) passing the target station into the horizontal starting position are rigidly attached to the foundation (21) ahead of curves and inclines. The recovery cam (54) is illustrated in dashed-dotted lines in FIG. 2. It is, of course, not actually arranged directly after the radial cam (50,51). The recovery cams (54) take hold of the lowered rollers (44) and raise them, so that the lever (40) is brought into its central position. However, this does not mean that the receptacle (13,14) under consideration is in its starting position since it can be tilted relative to the lever (40) by the unlocking angle. The final reversal of the receptacle (13,14) into the starting position is effected by an elastic catch element (55), consisting, for example, of polyamide, into which a catch tappet (56) of the bearing box (29) engages (FIG. 6).

In order to dampen the movement into the final position, two stopping elements (60) are attached onto the bearing box (30) which each impact a shock absorber (61) attached to the carrier (27).

In order to prevent dynamic forces acting upon the cart (5) from tilting them, one additional guide rail (64) is attached above each pipe (20) on curves and inclines at all target stations (11) (FIG. 4).

The drive (6) for the cart chains (4) is effected in that at least one steering rack (67) is attached on the lower side of the bearer (23) of each cart (5). The teeth (68) of the steering rack (67) lie lower than the toggle links (22). The driving chain (8) is sufficiently long so that at least two steering racks (67) for adjacent carts (5) simultaneously engage with them.

Figure 7:
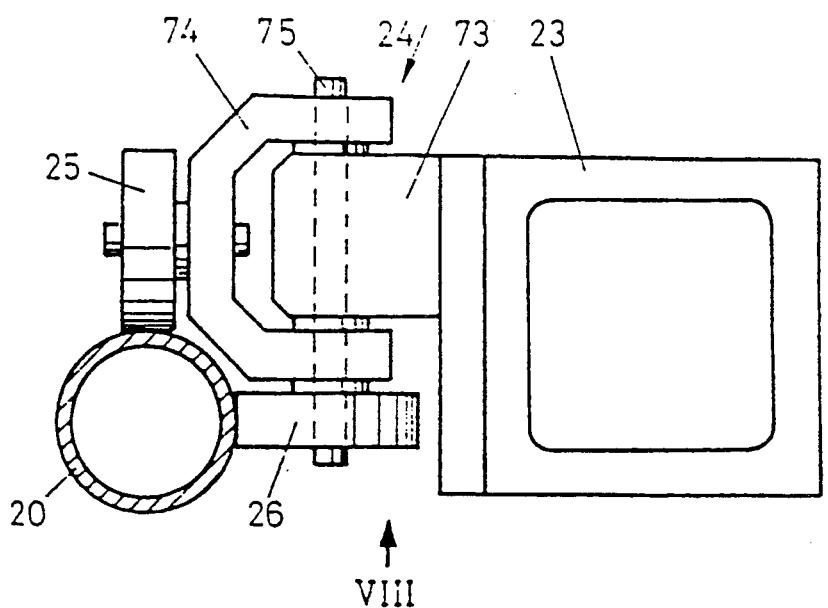
FIG. 7 is a front view of a different version of the running gear.
Figure 8:
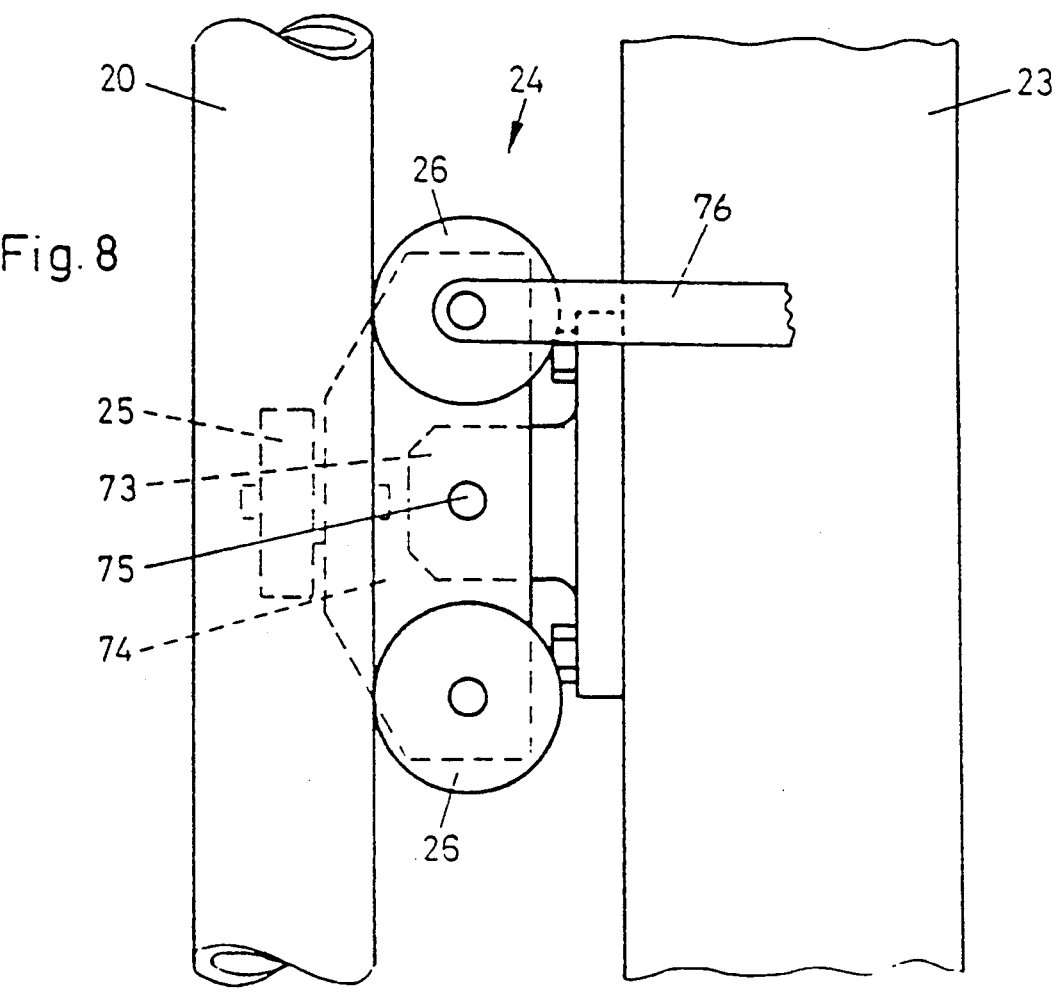
FIG. 8 is a bottom view of the running gear according to FIG. 7.

FIGS. 7 and 8 show a different variation of the running gear (24) that is particularly suitable for cart (5)

with greater distances between the axles. In order to avoid a slanted position of the rollers (25) against the pipes (20), and hence the related wear and tear of the rollers on curves, the roller retainer (74) arranged on a carrier (73) that is screwed onto the bearer (23) can be swiveled about a vertical axis (75). Two guide rollers (26) are arranged on both sides of the axis (75) on the roller retainer (74). These two guide rollers (26) result in the roller retainer (74). These two guide rollers (26) result in the roller retainer (74), and hence the roller (25), being guided parallel to the pipe (20), independent of the transverse position of the bearer (23) on curves. Both front and both rear roller retainers (74) are coupled by means of a tie bar (76) because only the inner pair of rollers (26) adjoins the pipe (20) on curves.

With longer carts it is practical to provide the activation rollers (44) at regular spacings- This means that the time available for the engagement of the radial cams (50,51) is same for all rollers (44).

The described plant obtains the optimal capacity of all receptacles (13,14) and thus a more reasonable operation, even with extremely different sizes of the unit load. The positive locking of the receptacles (13,14) in their starting position ensures a safe operation even at higher transport speeds. If a locking or activation mechanism becomes defective, the receptacle (13,14) under consideration is locked by the control device (12), and the receptacle carrier (27) is exchanged for a new one during a subsequent interruption of the operation. This exchange can be executed very quickly since the cart chains (4) must not be interrupted. The maintenance of the described plant is thus very effortless.

Depending on the purpose of the application, i.e., depending on the maximum size of the unit load to be transported, shorter or longer receptacles (13,14) can be mounted on identical carts (5) whereby only the length of the toggle links (22) must be correspondingly adapted. This means that the carts (5) can be reasonably manufactured in large quantities and the stock keeping simplified.

If all of the target stations (11) are arranged on the same side of the loop (2), the activation elements (38) can be omitted on the other side of the cart (5). The recovery cams (54) are, in this particular instance, constructed in such a way that they pull the raised activation rollers (44) towards the bottom.

Depending on the purpose of the application it may be practical to guide the two front activation rollers (44) of the carts (5) on a different track than the two rear activation rollers (44) and to laterally offset, in corresponding fashion, the radial cams (50,51) of each target station (11) against each plane of symmetry of the rail (3) is folded, for example, toward the inside. This means that a larger distance is available for the tilting of the radial cams (50,51) of the carts (5) between the active and inactive positions, so that the transport speed is increased and the requirements for the activation accuracy of the radial cams can be reduced.

The activation rollers (44) and radial cams (50,51) can also be interchanged.

The loop (102) has inclines and descents because it is preferably constructed three-dimensionally. The running gear (124) of the carts (105) is thus preferably constructed according to DE-OS 34 00 704.4. The bearers (123) of the carts (105) will then remain horizontal on inclines and descents. This means that the loops can also extend across steeper areas without risk of the packages (10) sliding off. The space requirement of the plant (101) can also be substantially reduced with this means.

Otherwise the carts (105) correspond with the described cart (5).

Figure 9:
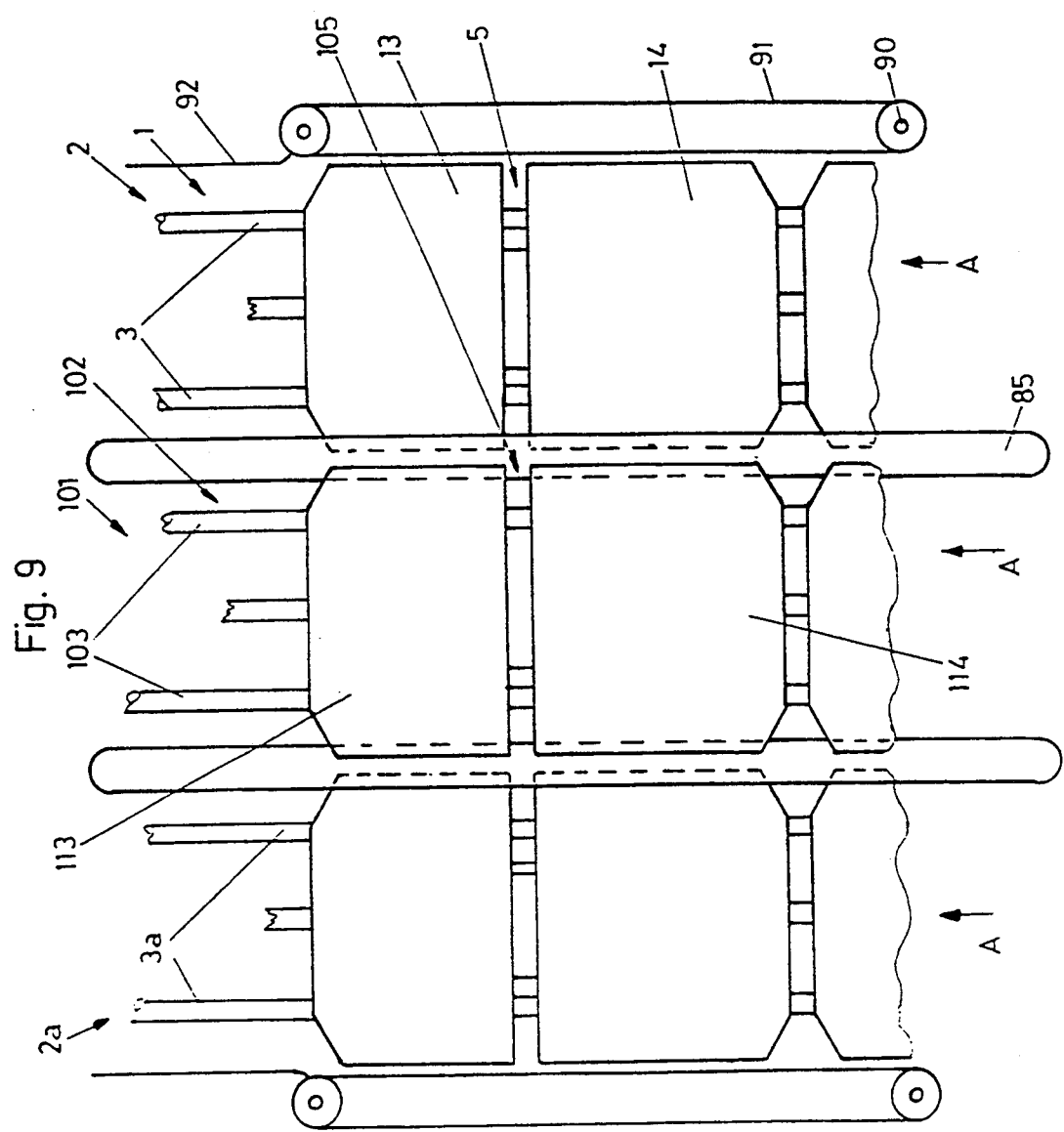
FIG. 9 is a top view of a transfer station.
Figure 10:
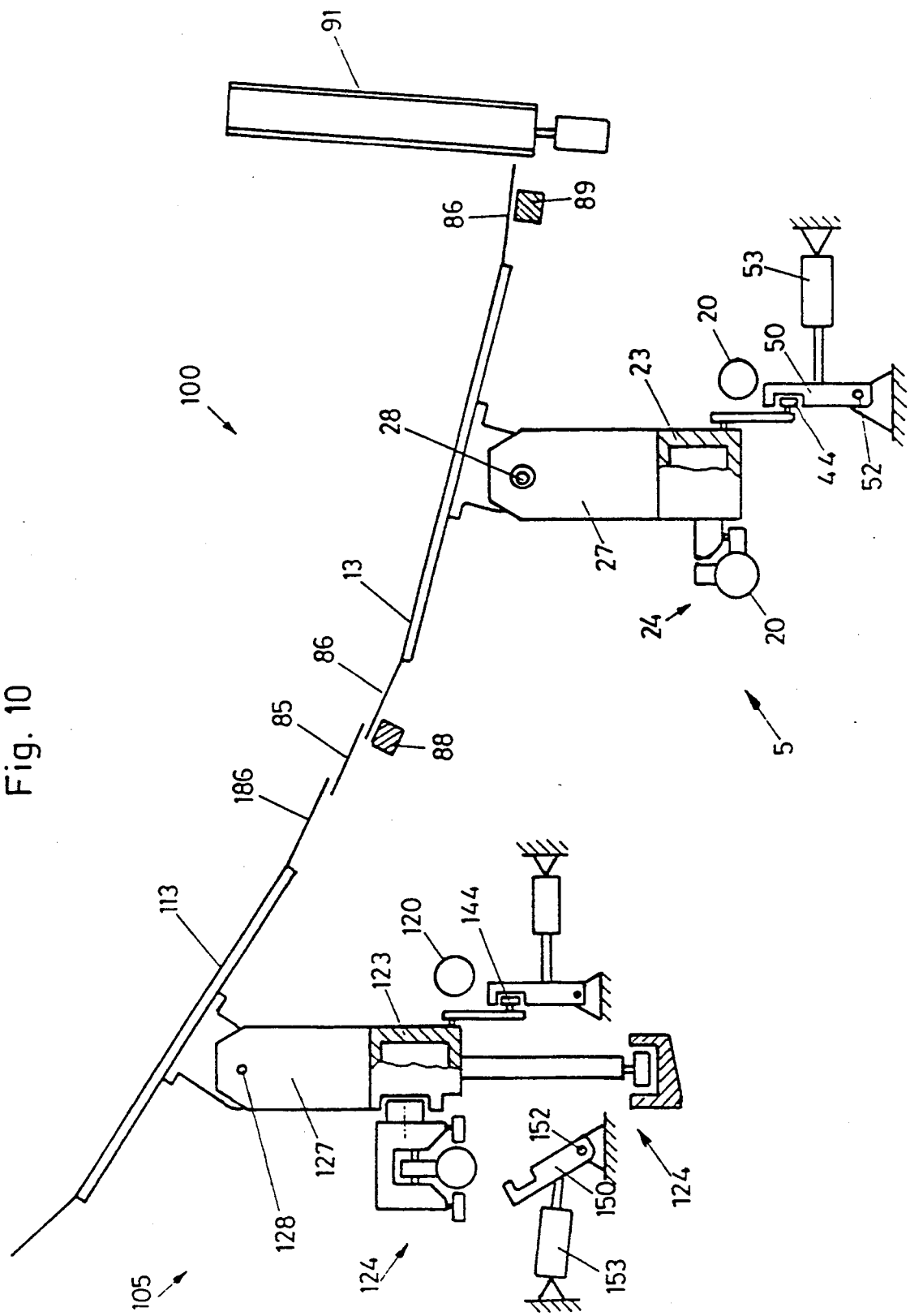
FIG. 10 is a partial cross section through a transfer station.
Figure 11:
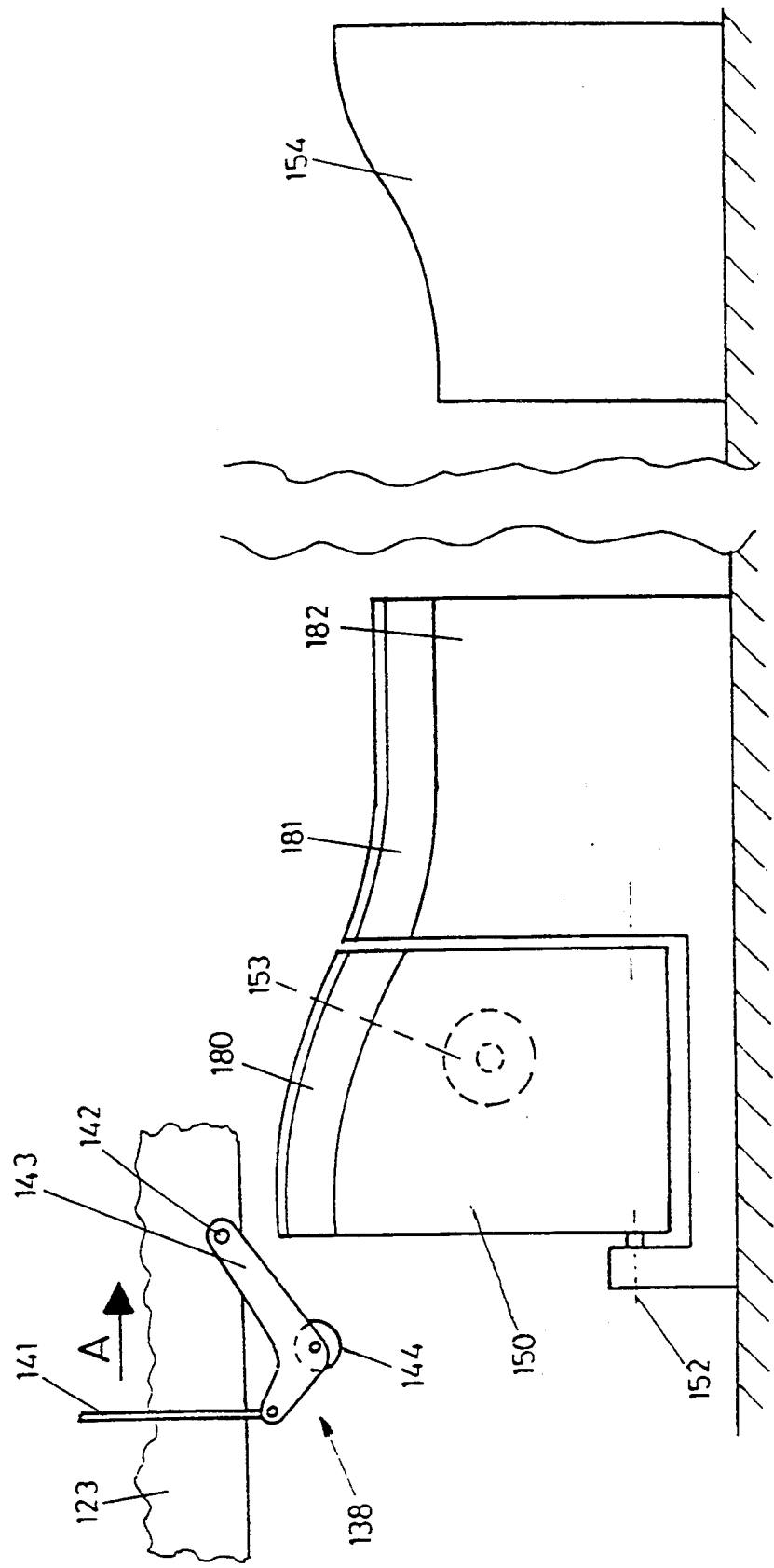
FIG. 11 is a side view of a radial cam.

FIGS. 9 to 11 illustrate the transfer station (100) in detail.

As compared to the tipping of the receptacles (13,14) at the target stations (11), the receptacles (113,114) must be tipped relatively gently at the transfer station (100) in order to prevent the packages (10) from sliding off laterally with respect to the receptacles (113,114) or from being tossed about. The radial cams (150) are for this reason longer in the moving direction at this particular location, i.e., oriented less sharply than the previously described radial cams (50) at the target stations (11), and the activation rollers (144) are guided in a restricted manner. FIGS. 10 and 11 show that the radial cam (150) is constructed with a groove (180) that pulls the activation roller (144) downward from its center position in the active state and guides the same on both sides. FIG. 11 clearly shows that the entire length of the radial cam (150) need not be constructed in a swiveling manner. It is sufficient only to construct a first part in a swiveling or laterally displaceable manner, while the groove in the second part in which the activation roller (144) has already been decoupled by more than its diameter, can extend within a stationary plate (182).

The recover cams (154) arranged ahead the next curve of the loop (102) are constructed in the same manner as the recovery cams (54).

If both carts (5,105) pass the transfer station (100) without being tilted, they should not overlap, as viewed from the top, because a larger package that is transported on the cart (5) passing on the lower level and that extends to one of the lateral edges of the cart (5) can contact the lateral edge of the cart (105) and cause disruptions. This is the reason why a gap between the lateral edges is formed in the tilted position of the receptacles (113,13) shown in FIG. 10. This gap is covered by a stationary transfer plate (85) that has approximately the same tilting angle as the edge areas of the receptacles (13,113), overlaps the receptacle (13), and is overlapped by the receptacle (113).

FIG. 10 shows that the lateral edges (86,186) of the receptacles (13,113) are slightly bent upwardly against the central area. In order to obtain a smooth, practically continuous transfer of the packages (10) from the receptacle (113) to the receptacle (13), the latter is substantially less tilted. If the central area of the receptacle (113) has a total tilting angle of 32°, a slant of approximately 14° for the receptacle (13) is sufficient. At the target stations (11), the receptacles (13) are tilted by a substantially larger angle, for example, by 35°. This means that they do not reach their total tilting angle at the transfer station (100). This is the reason why either the activation roller (44) or the receptacle (13 or 14) must be guided into its center position after decoupling and until the return of the receptacles (13,14) to the transfer station (110). Since the receptacles (13,14) have a certain free motion (unlocking angle) against the activation lever (40), not illustrated in FIG. 10, it may be practical to support the left edge shown in FIG. 10 with a plastic guide rail (88) in the decoupled stated. The edge (86) can then be guided with very little play between this rail (88) and the transfer plate (85), so that the package (10) practically slides continuously from the plate (85) onto the receptacle (13). The minute friction of the package (10) on the stationary plate (85) somewhat decelerates it. It may thus be practical if the cart (5) is offset backwards from the cart (105) by a certain distance.

In addition, another guide rail (89) can support the other edge (86) of the receptacle (13) The rails (88,89) can be utilized to return the receptacles (13) into its locked center position immediately after the transfer station (100). Because the receptacle (13) can be loaded during the return into its center position after leaving the transfer station (100), the previously described return by means of the catch element (55) may, under certain conditions, be insufficient because this element is too weak to lift a receptacle (13) that is loaded on one side.

In order to prevent the package (10) from sliding beyond the lower edge (86) of the receptacle (13), a limiting belt (91) that revolves around nearly vertical rollers (90) at the moving speed of the cart (5) is provided in the transfer area of the transfer station (100). A stationary wall (92) adjacent to the belt (91) suffices in the area within which the receptacles are raised.

The described arrangement makes it possible for a package (10), at the transfer station (100), to smoothly slide from one receptacle (113 or 114) of a cart (105) onto a predetermined receptacle (13 or 14) of a predetermined cart (5) that can be addressed by the control device (12), whereby the side of the package (10) provided with the bar code remains on top. This means that the possibility still exists to read this bar code before the target stations (11) by a reading device in order to check or control the radial cam (5) of the target station (11). The described manner of the direct transfer from the gross sorting facility (101) to the fine sorting facility (1) is exceptionally simple and required very few accessories and little space. The plant can thus be constructed and operated in an economical manner.

Should it be required that the bar code be read anew before the target stations (11), the receptacles (13,14) of the carts (5) can remain horizontal at the transfer station (100). The edge (86) of the receptacles (13,14) then preferably extends somewhat below the plate (86), so that the packages (10) are dropped over the last portion of their transfer distance. The control of the transfer can be substantially simplified by this means since the radial cams (50), the recovery cams (54) and the guide rails (88,89) can be omitted at the transfer station (100).

The control of the transfer process can also be simplified if all receptacles (13,14) of all carts (5) of the fine distribution facility (1) are tilted at the transfer station (100), independent of a package (10) being transferred onto the same or being previously loaded. The limiting belt (91) must, in this particularly instance, begin somewhat earlier, namely at the location where the receptacles (13,14) are tipped.

With this particular variation it is also possible to omit the transfer plate (85), since the two loops (2,102) can be guided closer to each other if the receptacles (13,14) are tilted without risk of collision between large packages on the receptacles (13,14) and the edge of those on the receptacles (113,114).

If the loop (102) enters between the two fine distribution loops (2,2a) from the top and also exits the same towards the top, the receptacles (13,14) must be tilted before the loop (102) reaches the transfer elevation.

However, if the loop (102) enters between the loops (2,2a) from the bottom, the loops (2,2a) must be brought into the proximity of the loop (102) after the elevation of the loop (102) required for the transfer has been reached, whereby the receptacles (13,14) are already tilted during this approach.

Figure 12:
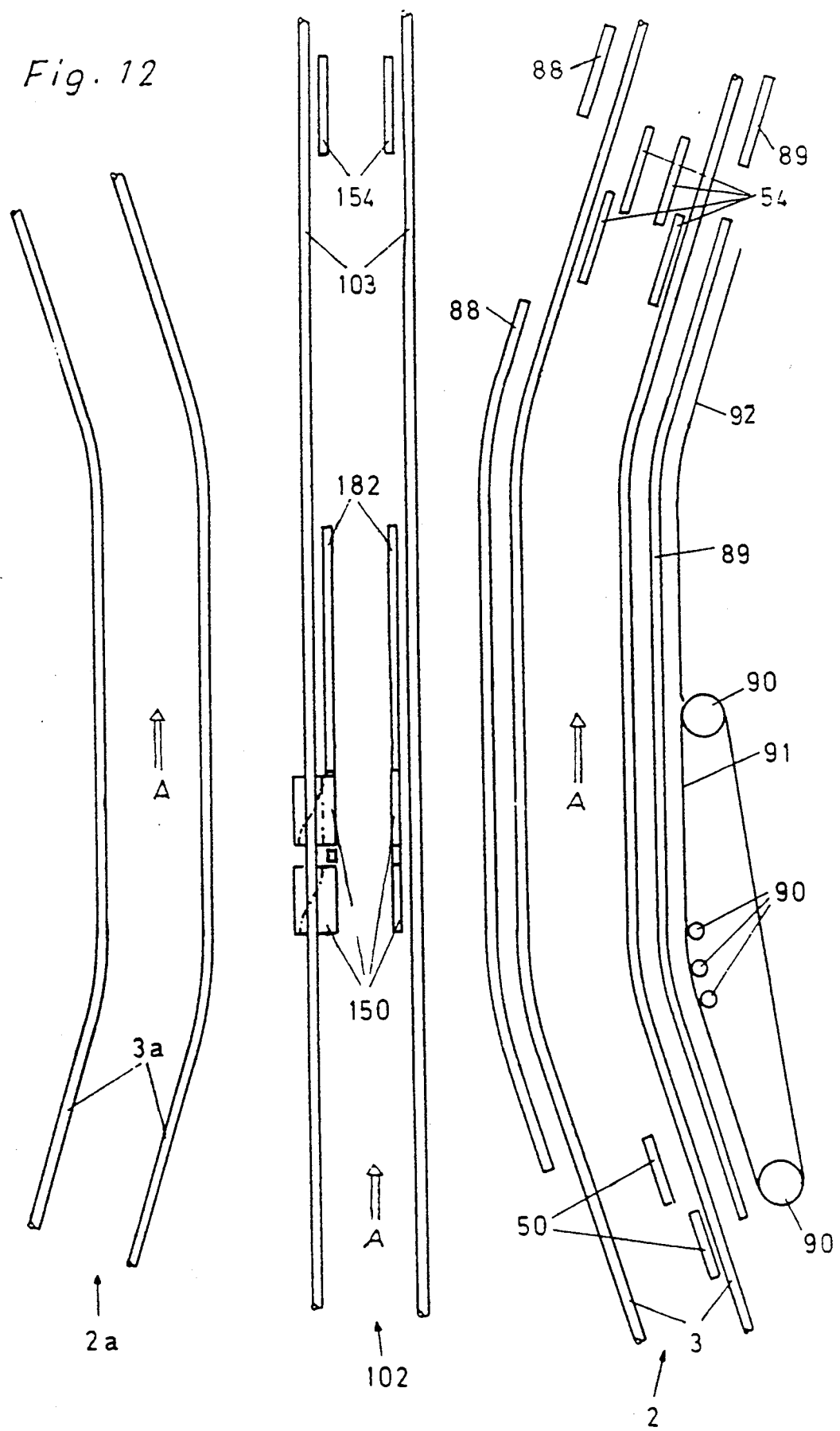
FIG. 12 is a top view of a variation of the transfer station without carts.

A horizontal projection of the transfer station (100) without carts (5,105) for this variation is schematically illustrated in FIG. 12, whereby the stationary, noncontrollable radial cams (50), the recovery cams (54), the rails (88,89), the belt (91) and the wall (92) are only illustrated for the loop (2). However, they also exist as a mirror image for the loop (2a).

In this particular variation, it is practical to guide both activation rollers (44) on each side of the cart (5) on different tracks, for example, by arranging the roller (44) on the inner side of the front arm (43), viewed in moving direction (A) (FIG. 2), but on the outer side at the rear arm (43). This means that two stationary radial cams (50) that are offset with respect to each other in the longitudinal direction can be arranged at the entry of the loop (2) into the transfer station to simultaneously tilt both receptacles (13,14) of a cart (5), and to arrange two offset recovery cams (54) for the simultaneous recovery of these receptacles to their starting positions. This measure prevents a relative movement between the receptacles (13,14) of a cart, which is particularly important during the transport of large packages (10) that occupy both receptacles. The small angular movement after the raising process of the receptacles (13,14) to return the same not their locked position by means of the guide rails (88,89) can also be executed successively, so that only one rail (88,89) each is required per side. If this small angular movement should be executed synchronously, it is also possible to utilize one cam or one roll per side on the lower side of the receptacles (13,14) within different tracks, and to correspondingly utilize two rails (88,89) that are offset with respect to each other in the longitudinal direction directly adjacent to the recovery cams (54). The left recovery cam (54) is constructed diametrically opposite to the right recovery can in order to obtain a restricted guidance during the return of the receptacles (13,14).

If no larger unit loads that occupy both receptacles are to be sorted, the control can be simplified accordingly, and the loading stations (9) and the target stations (11) can be correspondingly shortened. In this particular instance, each cart (5 or 105) can also carry just one single receptacle. In particular, for the gross distributional facility (101), the loop (102) of which is constructed three-dimensionally, tighter curve radii and steeper inclines and descents can be realized which in turn reduces spatial requirements.

Additional loops can be connected to the loops (2,2a) via the described transfer stations (100). It can, for example, be practical to connect a storage loop twice to the loops (2,2a) via the transfer stations (100) in the same manner as the loop (102), whereby the packages (10) can be transferred from the loops (2) to the storage loop at one transfer station, and from the storage loop onto the loop (2) at the other transfer station. This makes it possible that packages (10) that remain on loop (2) because of a blocked or congested target station (11) can be stored on the storage loop and automatically transported to this target station (11) after the defect has been eliminated, whereby the loop (2) maintains its full transport capacity. In this particular instance the one transfer station (100) forms the loading station of the storage belt.

Having described the invention, what is claimed is:
1. A sorting plant for unit loads that comprises:

a first closed rail that forms a first loop; several first carts that move on said first rail and are coupled to form a first endless cart chain, wherein each of said first carts has a first receptacle that can be tilted in at least one direction from a horizontal starting position into a tilting position about an axis that extends along the longitudinal direction of said cart, and each of said first carts has a first activation element to tilt said first receptacle;

a first drive to drive said first cart chain;

at least one loading station along said first loop to load said first receptacles with unit load;

at least one second closed rail, said at least one second closed rail forming a second loop;

several second carts that move on said at least one second rail and are coupled to form a second endless cart chain, wherein each of said second carts has a second receptacle that can be tilted from a horizontal starting position into a tilting position, and each of said second carts has a second activation element to tilt said second receptacle;

a second drive to drive said second cart chain;

a plurality of transfer stations on each of said second loops in which said second carts of said second loops move parallel to said first carts;

a synchronizing device that synchronizes the speed and relative position of said first and second cart chains in such a way that one of said first carts rolls into one of said transfer stations adjacent to one of said second carts at the same speed, but offset by a predetermined longitudinal distance; and at least one switching element per each of said transfer stations that can be switched between an active and inactive state, whereby said switching element activates said activation element of one of said passing first carts in the active state and tilts said first receptacle in such a way that the unit load transported on said receptacle slides onto said second receptacle of said second cart moving adjacent to the same.

2. A sorting plant according to claim 1, characterized by the fact that each of said transfer stations comprises a stationary plate that is slanted transverse to the moving direction and is overlapped by said tilted first receptacle.

3. A sorting plant according to claim 1, characterized by the fact that said second receptacle can be tilted by said second activation element at each of said transfer stations.

4. A sorting plant according to claim 3, characterized by the fact that a control device at each of said transfer stations only tilts said second receptacle if the unit load is to be transferred from said first receptacle onto said second receptacle at said respective transfer station.

5. A sorting plant according to claim 3, characterized by the fact that all said second receptacles are tilted and subsequently returned to their starting position at each of said transfer stations.

6. A sorting plant according to claim 3, characterized by the fact that a limiting wall is provided at each of said transfer stations on the side of said second cart that opposes said first cart.

7. A sorting plant according to claim 4, characterized by the fact that a limiting wall is provided at each of said transfer stations on the side of said second cart that opposes said first cart.

8. A sorting plant according to claim 5, characterized by the fact that a limiting wall is provided at each of said transfer stations on the side of said second cart that opposes said first cart.

9. A sorting plant according to claim 6, characterized by the fact that said limiting wall is constructed as a rotating belt over at least a portion of its length.

10. A sorting plant according to claim 7, characterized by the fact that said limiting wall is constructed as a rotating belt over at least a portion of its length.

11. A sorting plant according to claim 8, characterized by the fact that said limiting wall is constructed as a rotating belt over at least a portion of its length.

12. A sorting plant according to claim 3, characterized by the fact that stationary guide rails are arranged at each of said transfer stations below at least one of the lateral edges of said second receptacles.

13. A sorting plant according to claim 4, characterized by the fact that stationary guide rails are arranged at each of said transfer stations below at least one of the lateral edges of said second receptacles.

14. A sorting plant according to claim 5, characterized by the fact that stationary guide rails are arranged at each of said transfer stations below at least one of the lateral edges of said tilted second receptacles.

15. A sorting plant according to claim 6, characterized by the fact that stationary guide rails are arranged at each of said transfer stations below at least one of the lateral edges of said second receptacles.

16. A sorting plant according to claim 7, characterized by the fact that stationary guide rails are arranged at each of said transfer stations below at least one of the lateral edges of said second receptacles.

17. A sorting plant according to claim 8, characterized by the fact that stationary guide rails are arranged at each of said transfer stations below at least one of the lateral edges of said tilted second receptacles.

18. A sorting plant according to claim 9, characterized by the fact that stationary guide rails are arranged at each of said transfer stations below at least one of the lateral edges of said second receptacles.

19. A sorting plant according to claim 10, characterized by the fact that stationary guide rails are arranged at each of said transfer stations below at least one of the lateral edges of said second receptacles.

20. A sorting plant according to claim 11, characterized by the fact that stationary guide rails are arranged at each of said transfer stations below at least one of the lateral edges of said tilted second receptacles.

21. A sorting plant according to claim 2, characterized by the fact that said second receptacle can be tilted by said second activation element at each of said transfer stations.

22. A sorting plant according to claim 21, characterized by the fact that a control device at each of said transfer stations only tilts said second receptacle if the unit load is to be transferred from said first receptacle onto said second receptacle at said respective transfer station.

23. A sorting plant according to claim 21, characterized by the fact that all said second receptacles are tilted and subsequently returned to their starting position at each of said transfer stations.

24. A sorting plant according to claim 21, characterized by the fact that a limiting wall is provided at each of said transfer stations on the side of said second cart that opposes said first cart.

25. A sorting plant according to claim 22, characterized by the fact that a limiting wall is provided at each of said transfer stations on the side of said second cart that opposes said first cart.

26. A sorting plant according to claim 23, characterized by the fact that a limiting wall is provided at each of said transfer stations on the side of said second cart that opposes said first cart.

27. A sorting plant according to claim 24, characterized by the fact that said limiting wall is constructed as a rotating belt over at least a portion of its length.

28. A sorting plant according to claim 25, characterized by the fact that said limiting wall is constructed as a rotating belt over at least a portion of its length.

29. A sorting plant according to claim 26, characterized by the fact that said limiting wall is constructed as a rotating belt over at least a portion of its length.

30. A sorting plant according to claim 21, characterized by the fact that stationary guide rails are arranged at said transfer station below at least one of the lateral edges of said tilted second receptacles.

31. A sorting plant according to claim 22, characterized by the fact that stationary guide rails are arranged at said transfer station below at least one of the lateral edges of said tilted second receptacles.

32. A sorting plant according to claim 23, characterized by the fact that stationary guide rails are arranged at said transfer station below at least one of the lateral edges of said second receptacles.

33. A sorting plant according to claim 24, characterized by the fact that stationary guide rails are arranged at said transfer station below at least one of the lateral edges of said tilted second receptacles.

34. A sorting plant according to claim 25, characterized by the fact that stationary guide rails are arranged at said transfer station below at least one of the lateral edges of said tilted second receptacles.

35. A sorting plant according to claim 26, characterized by the fact that stationary guide rails are arranged at said transfer station below at least one of the lateral edges of said second receptacles.

36. A sorting plant according to claim 27, characterized by the fact that stationary guide rails are arranged at said transfer station below at least one of the lateral edges of said tilted second receptacles.

37. A sorting plant according to claim 28, characterized by the fact that stationary guide rails are arranged at said transfer station below at least one of the lateral edges of said tilted second receptacles.

38. A sorting plant according to claim 29, characterized by the fact that stationary guide rails are arranged at said transfer station below at least one of the lateral edges of said second receptacles.

39. A sorting plant according to one of claims 3-5, 6-8, 9-11, 12-14, 15-17, 18-20, 21-23, 24-26, 27-29, 30-32, 33-35 or 36-38, characterized by the fact that stationary guide rails to center said second receptacles into their horizontal position are provided after each of said transfer stations, whereby said guide rails engage said second receptacles.

* * * * *